United States Patent [19]

McCabe et al.

[11] Patent Number: 6,011,448

[45] Date of Patent: Jan. 4, 2000

[54] METHOD AND APPARATUS FOR FREQUENCY MODULATION SYNTHESIS

[75] Inventors: Daniel H. McCabe, Bellevue, Wash.; Peter Alexander Manson, Cary, N.C.

[73] Assignee: International Business Machines Corporation, Armonk, N.Y.

[21] Appl. No.: 08/949,574

[22] Filed: Oct. 14, 1997

[51] Int. Cl.$^7$ .............................. G10H 5/00; G06F 1/02
[52] U.S. Cl. ................. 332/117; 327/106; 327/107; 364/721; 84/622; 84/624; 84/696
[58] Field of Search ...................... 327/106, 107; 84/624, 696, 600, 601, 602, 622, 607; 364/721; 332/117

[56] References Cited

U.S. PATENT DOCUMENTS 4,018,121  4/1977  Chowning ............................ 84/696
4,249,447  2/1981  Tomisawa ............................ 84/605

OTHER PUBLICATIONS

IRE Transactions on Electronic Computers, "The Cordic Trigonometric Computing Technique" by Jack E. Volder.
1980 IEEE, "Music Synthesis Using Real Time Digital Techniques" by Harold G. Alles.
Computer Music Journal, vol. 3, #3, pp. 28–36, "An Inexpensive Digital Sound Synthesizer" by H. G. Alles, Bell Laboratories, Murray Hill, NJ 07974.
Journal of the Audio Engineering Society, pp. 526–534, "The Synthesis of Complex Audio Spectra by Means of Frequency Modulation", by John M. Chowning, Stanford Artificial Intelligence Laboratory, Stanford, CA.
Dr. Dobb'Journal, Oct. 1990, pp. 152–158, "Implementing Cordic Algorithms", by Pitts Jarvis.
Yamaha®L S1 OPL3 YMF262 FM Operator Type L2 Application Manual, CAtalog #LS1–6MF2622, 1987, Yamaha Corporation, Japan.

*Primary Examiner*—Arnold Kinkead
*Attorney, Agent, or Firm*—Thomas F. Galvin

[57] ABSTRACT

A method for frequency modulation synthesis and apparatus for performing the method. The method uses additions rather than multiplies and therefore saves the space and cost of multipliers in circuit implementations. The method saves further resources by using the coordinate rotation digital computer (CORDIC) algorithm to acquire sine values as opposed to an extensive sine look-up table. The method can be implemented with either a dedicated digital circuit or a programmed special purpose processor such as a digital signal processor. The hardware for implementing the method is normally integrated onto a semiconductor device.

7 Claims, 5 Drawing Sheets

FIG. 3

CYCLE OPERATIONS

| Cycle | SHIFTA | SHIFTB | ADD/SUBA | SHIFTC | SHIFTD | ADD/SUBB | ADD/SUBC | SHIFTC | SHIFTD | ADD/SUBD | ADD/SUBE | ADD/SUBF |
|---|---|---|---|---|---|---|---|---|---|---|---|---|
| 1 | SH OUT | | | | | | | | | | | |
| 2 | SH X1 | SH Y1 | | | | X1+SH Y1 Y1+SH X1 Z1I+AT0 | WN+B | | | | | |
| 3 | SH X1 | SH Y1 | | | | X1+SH Y1 Y1+SH X1 Z1+AT1 | | | | | | |
| 4 | SH X1 | SH Y1 | | | | X1+SH Y1 Y1+SH X1 Z1+AT2 | | | | | | |
| 5 | SH X1 | SH Y1 | | | | X1+SH Y1 Y1+SH X1 Z1+AT3 | | | | | | |
| 6 | SH X1 | SH Y1 | | | | X1+SH Y1 Y1+SH X1 Z1+AT4 | | SH X2 | SH Y2 | | | X2+SH Y2 Y2+SH X2 Z2I+AT0 |
| 7 | SH X1 | SH Y1 | | | | X1+SH Y1 Y1+SH X1 Z1+AT5 | | SH X2 | SH Y2 | | | X2+SH Y2 Y2+SH X2 Z2+AT1 |
| 8 | SH X1 | SH Y1 | | | | X1+SH Y1 Y1+SH X1 Z1+AT6 | | SH X2 | SH Y2 | | | X2+SH Y2 Y2+SH X2 Z2+AT2 |
| 9 | SH X1 | SH Y1 | | | | X1+SH Y1 Y1+SH X1 Z1+AT7 | | SH X2 | SH Y2 | | | X2+SH Y2 Y2+SH X2 Z2+AT3 |
| 10 | SH X1 | SH Y1 | | | | X1+SH Y1 Y1+SH X1 Z1+AT8 | | SH X2 | SH Y2 | | | X2+SH Y2 Y2+SH X2 Z2+AT4 |
| 11 | SH X1 | SH Y1 | | | | X1+SH Y1 Y1+SH X1 Z1+AT9 | | SH X2 | SH Y2 | | | X2+SH Y2 Y2+SH X2 Z2+AT5 |
| 12 | SH X1 | SH Y1 | | | | X1+SH Y1 Y1+SH X1 Z1+AT10 | | SH X2 | SH Y2 | | | X2+SH Y2 Y2+SH X2 Z2+AT6 |
| 13 | SH X1 | SH Y1 | | | | X1+SH Y1 Y1+SH X1 Z1+AT11 | | SH X2 | SH Y2 | | | X2+SH Y2 Y2+SH X2 Z2+AT7 |
| 14 | SH X1 | SH Y1 | | | | X1+SH Y1 Y1+SH X1 Z1+AT12 | | SH X2 | SH Y2 | | | X2+SH Y2 Y2+SH X2 Z2+AT8 |
| 15 | SH X1 | SH Y1 | | | | X1+SH Y1 Y1+SH X1 Z1+AT13 | | SH X2 | SH Y2 | | | X2+SH Y2 Y2+SH X2 Z2+AT9 |
| 16 | SH X1 | SH Y1 | | | | X1+SH Y1 Y1+SH X1 Z1+AT14 | | SH X2 | SH Y2 | | | X2+SH Y2 Y2+SH X2 Z2+AT10 |
| 17 | SH X1 | SH Y1 | | | | X1+SH Y1 Y1+SH X1 Z1+AT15 | | SH X2 | SH Y2 | | | X2+SH Y2 Y2+SH X2 Z2+AT11 |
| 18 | | | | | | | | SH X2 | SH Y2 | | | X2+SH Y2 Y2+SH X2 Z2+AT12 |
| 19 | | | X1F+X2F | | | | | SH X2 | SH Y2 | | | X2+SH Y2 Y2+SH X2 Z2+AT13 |
| 20 | | | | | | | | SH X2 | SH Y2 | | | X2+SH Y2 Y2+SH X2 Z2+AT14 |
| 21 | | | | | | | | SH X2 | SH Y2 | | | X2+SH Y2 Y2+SH X2 Z2+AT15 |
| 22 | | | | | | | | | | | WB+A' | |

METHOD AND APPARATUS FOR FREQUENCY MODULATION SYNTHESIS

BACKGROUND

FIELD OF THE INVENTION

This invention relates to frequency modulation (FM) synthesis, a popular technique for performing frequency modulation in digital computer systems. The technique is especially popular for the generation of harmonic-rich musical tones in electronic musical instruments and multimedia personal computers, although it does have other uses. More specifically this invention relates to how an FM synthesis operator is calculated using digital circuits.

DESCRIPTION OF THE PROBLEM SOLVED

The most widespread application of FM synthesis is in sound generation. Such applications use an FM operator equation of the form:

$$FM(t) = A \sin(\omega t + \beta FM(t))$$

The derivation and use of this equation in FM synthesis is described in detail in U.S. Pat. No. 4,018,121 to Chowning, which is incorporated herein by reference. This equation is used in the OPL series sound generator chips manufactured by Yamaha Corporation. In addition to implementing the basic operator equation, these chips add a feedback term to allow richer harmonics. This technique is described in U.S. Pat. No. 4,249,447 to Tomisawa which is incorporated herein by reference. The group of circuits that performs the operator equation is called an "operator". Most sound chips combine multiple basic operators in series and parallel to form complex tone generators, and also to provide for two or more sound channels as might be required to provide left and right channels for stereo sound.

Note that the basic FM operator equation requires a multiply for the amplitude factor A and the feedback factor $\beta$. In practice, the feedback factor can be practically implemented by simply using a bit-wise shift, however, a multiply is still required for the amplitude factor A. This is because the amplitude must be controlled more precisely and hence, there is a requirement for multiplication by an amplitude factor with a much larger number of discrete increments. FIG. 1 shows a signal flow diagram for circuitry commonly in use to implement the FM operator. Note the multiplier shown at 101. In addition, the sine operation at 102 requires a large sine look-up table. The problem with the current approach is that both the multiplier and the large sine look-up table require an extensive amount of circuitry. Multipliers are complex to implement on a chip and require large area. The sine look-up table must be large and therefore takes up a large block of memory, either on-chip or off-chip. What is needed is a simpler, more efficient method of implementing the FM synthesis operator which does not require multipliers or large look-up tables.

SUMMARY

The present inventions solves the problem described above by providing a method of frequency modulation synthesis that can be carried out with shifts and additions, and without a large sine table. According to the present invention, an input signal and a feedback signal are added together. The sine of the resultant signal is then determined. In addition, the resultant signal is added to a transformed amplitude A', which is related to the true signal amplitude A in the preferred embodiment by the equation $A' = \cos^{-1}(A/2)$. The sine of this second addition is also determined. The sine's of these two signals are then added together to produce the output. The output is shifted to provide the feedback signal. In this way, the multiplications are eliminated from the FM synthesis operator.

In the preferred embodiment, the sines are calculated using the coordinate rotation digital computer (CORDIC) algorithm. The use of this algorithm improves the efficiency of the FM synthesis operation even further because it can compute the sine of a signal without the large look-up table. The resulting complete FM operator only requires a very small ARCTAN look-up table to compute the amplitude A'.

The FM synthesis operator described above can be implemented in dedicated hardware consisting of an output and an input to receive the initial value input, a storage circuit for precomputed ARCTAN values, and two or more computation units for computing the CORDIC algorithm connected together and controlled by a sequencer. In the preferred embodiment the computation units each include three or more multiplexers and two or more shifters. One shifter is connected to the output of one of the multiplexers and one is connected to an input of one of the multiplexers. The computation unit also includes three registers, two of which are connected to one of the multiplexers, and three add-subtract units disposed between the three registers and the two shifters. One of the registers is connected to the storage circuit. The FM operator can also be implemented in a programmed processor such as a digital signal processor.

The FM operator according to the present invention is preferably implemented on a semiconductor device or "chip". Such a chip has address and data inputs and an output, and at least one operator is integrated onto the chip between the data input and the output. In a typical music application, more than one operator would be used as cascading operators would allow the creation of richer tones. There may also be multiple channels, for example, a left and right channel for stereo sound.

Because the present invention allows the FM synthesis operation to be carried out without multipliers and without a large sine table, the invention allows less expensive circuitry to be used for FM synthesis than possible with the prior art methods. The circuitry also takes up less space, which is important because space is at a premium with today's high density integrated circuits.

BRIEF DESCRIPTION OF THE DRAWINGS

FIG. 3 illustrates the pipeline operations which are carried out to implement the present invention in a processor or under the control of a hardware sequencer.

DETAILED DESCRIPTION OF THE PREFERRED EMBODIMENTS

In order to appreciate the invention, it is necessary to understand how the FM operator equation discussed in the BACKGROUND section of this application is transformed to an equation which only requires additions and no multiplies. Recall the basic FM operator equation:

$$FM(t) = A \sin(\omega t + \beta FM(t)).$$

To simplify the equation we need to eliminate the need for multiplication by the amplitude factor A. For clarity, this transformation is done without the feedback term using the equation:

$$FM(t) = A \sin(\omega \cdot t).$$

Note the following trigonometric identities:

$$\sin(\theta + \phi) = \sin\theta \cdot \cos\phi + \sin\phi \cdot \cos\theta$$

$$\sin(\theta - \phi) = \sin\theta \cdot \cos\phi - \sin\phi \cdot \cos\theta.$$

Therefore:

$$\sin(\theta + \phi) + \sin(\theta - \phi) = 2\cos\phi \cdot \sin\theta.$$

Let $\theta = \omega \cdot t$. Then:

$$2 \cdot \cos\phi \cdot \sin(\omega t) = \sin(\psi t + \phi) + \sin(\psi t - \phi).$$

If we let $A = 2 \cdot \cos\phi$, the multiplications in the FM operator equation are transformed into additions:

$$FM(t) = A \sin(\psi t) = \sin(\psi t + \phi) + \sin(\psi t - \phi).$$

In both terms, the $\phi$ term must be either added or subtracted. However, we can eliminate one of those additions or subtractions as follows:

$$2 \cdot \sin(\psi t + \phi) \cdot \cos\phi = \sin(\psi t + 2\phi) + \sin(\psi t).$$

This last transformation introduced an amplitude dependent phase shift. This phase shift, however, is not perceived by the human ear, and is therefore acceptable in most applications. Thus instead of adding and subtracting a $\phi$ term from each term of the addition, we can simply add a $2\phi$ term, which we call the transformed amplitude A', and is related to the original amplitude factor A of the signal as follows:

$$A' = 2\phi = \cos^{-1}(A/2).$$

The FM operator equation without feedback has not been transformed into a form with two sine evaluations, but no multiplications, thus saving the extra space and expense of multipliers in a hardware implementation. The $\beta$ feedback term can now be added back into this "additive" transform. This results in a new equation, without multiplication of an amplitude term, as follows:

$$FM(t) = A \sin(\psi t + \beta) = \sin(\psi t + \beta + 2\phi) + \sin(\psi t + \beta).$$

Figure 1:
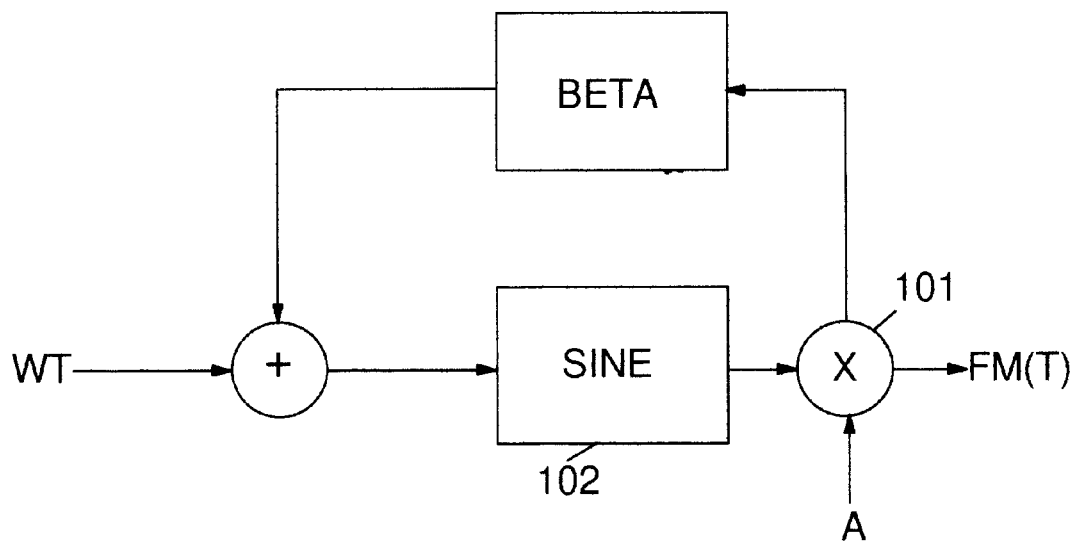
FIG. 1 shows a signal flow diagram for the prior art method of frequency modulation synthesis.
Figure 2:
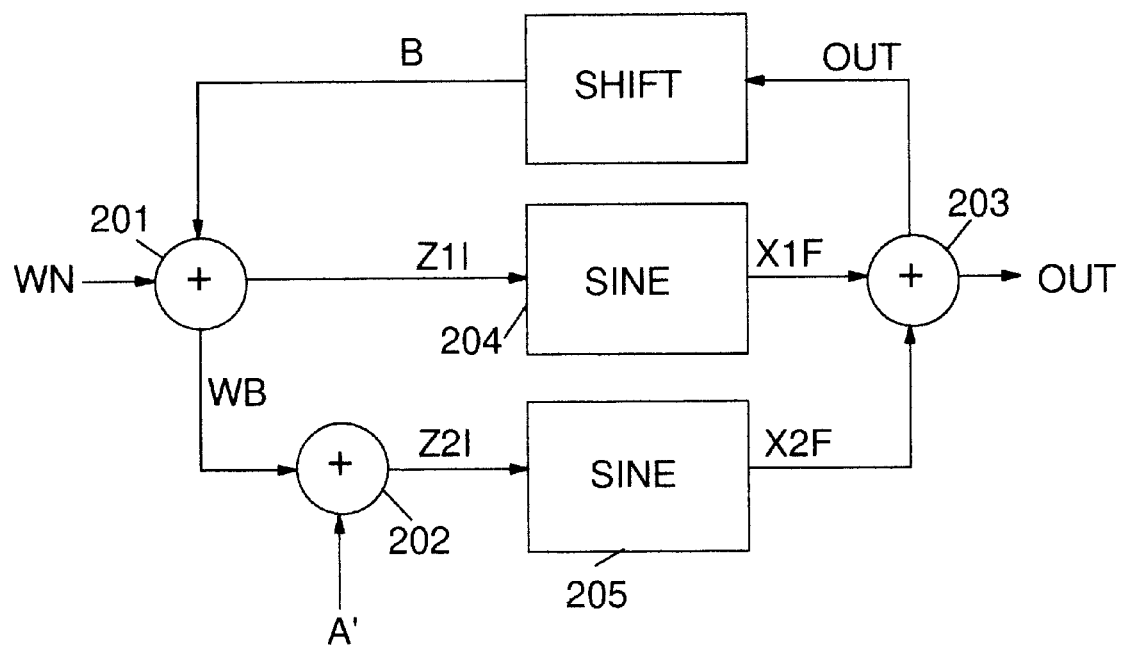
FIG. 2 shows a signal flow diagram for the FM synthesis method of the present invention.

FIG. 2 shows a signal flow diagram according to the present invention, which implements the new additive FM synthesis equation. The input Wn is added to the feedback factor $\beta$ at 201. If the process is just beginning and there is no feedback factor, the input Wn simply supplies the initial value to the process. The result of the addition at 201 is supplied to a sine operation at 204 as resultant signal Z1I. It is also supplied to a second adder 202. This path is labeled WB. At adder 202 the result of the first add is added to the amplitude A'. This second add produces a resultant signal Z2I. The results of the two sine operations are X1F and X2F, respectively. These two signals are added at 203, to produce the final output. The final output is also fed into a shift operator to produce the feedback factor $\beta$. The shift is used instead of a multiplier.

As previously discussed, although the method described above eliminates multipliers, sine operations are still required. The two sine operations can be performed with any technique; however, in the preferred embodiment, the sine operations are performed using the coordinate rotation digital computer (CORDIC) algorithm. The CORDIC algorithm requires no large look-up tables and can be implemented in relatively simple circuitry. This algorithm saw first application in the computer industry in the construction of special purpose digital computers for airborne navigation, but may be used to efficiently compute a variety of transcendental functions. In order to use the algorithm to compute circular functions we begin with a vector (x,y,z) where z is the input angle of interest in radians. If we iterate the computation sequence shown below, we effectively drive the z input angle to zero, and increment and decrement the x and y values by $2^n$ quantities until they reflect the cosine and sine of the input angle, respectively.

It is important when performing this iteration to have initial values of K and O for x and y in the initial vector, where $K = \cos a_0 \cdot \cos a_1 \cdot \ldots \cdot \cos a_n$, so that the general iteration which forces the following result:

$$[x, y, z] \Rightarrow [1/K(x\cos z - y\sin z), 1/K(y\cos z + x\sin z), 0]$$

actually becomes:

$$[x, y, z] = [K, 0, z] \Rightarrow [\cos z, \sin z, 0].$$

Note in the above calculation of K, the ith increments of are just the $2^n$ binary increments of angles that we add or subtract from z to iteratively drive z to zero using the iteration sequence below. The CORDIC algorithm is well known and widely discussed in literature. It is a common way of implementing circular functions in hardware.

In order to eliminate the need for a hardware sine table with a large input address space, we employ the CORDIC algorithm to compute the required sine values using an iterated series of additions and bit shifts. Specifically, we iterate the following calculation sequence:

$$x_{n+1} = x_n - d_n Y_n \cdot 2^{-n} \quad Y_{n+1} = y_n + d_n x_n \cdot 2^{-n} \quad z_{n+1} = z_n - d_n \cdot \tan^{-1}(2^{-n}), \text{ where } d_n = +1 \text{ if } z_n \geq 0, \text{ otherwise}, -1.$$

The $2^{-n}$ is implemented by an n-bit right shift. To calculate sine values using the CORDIC algorithm we begin with initial values:

$$x_0 = 0.607252, \text{ and } y_0 = 0 \quad z_0 = \text{input angle in radians}.$$

As we iterate through the algorithm, the current value of $y_n$ will converge on the sine of the input angle. For example, sixteen iterations will provide accurate sine values to sixteen bits. Other than hardware to perform additions and one-bit shifts of intermediate values, all that this algorithm requires is a small (relative to a large precision sine table) table of precomputed arctangent values, where the size of the table equals the number of iterations to be performed. This process is valid for angles:

$$-\pi/2 \leq \theta \leq \pi/2$$

For angles outside this range:

$$\sin(\pi/2 - \theta) = \sin\theta.$$

Figure 4:
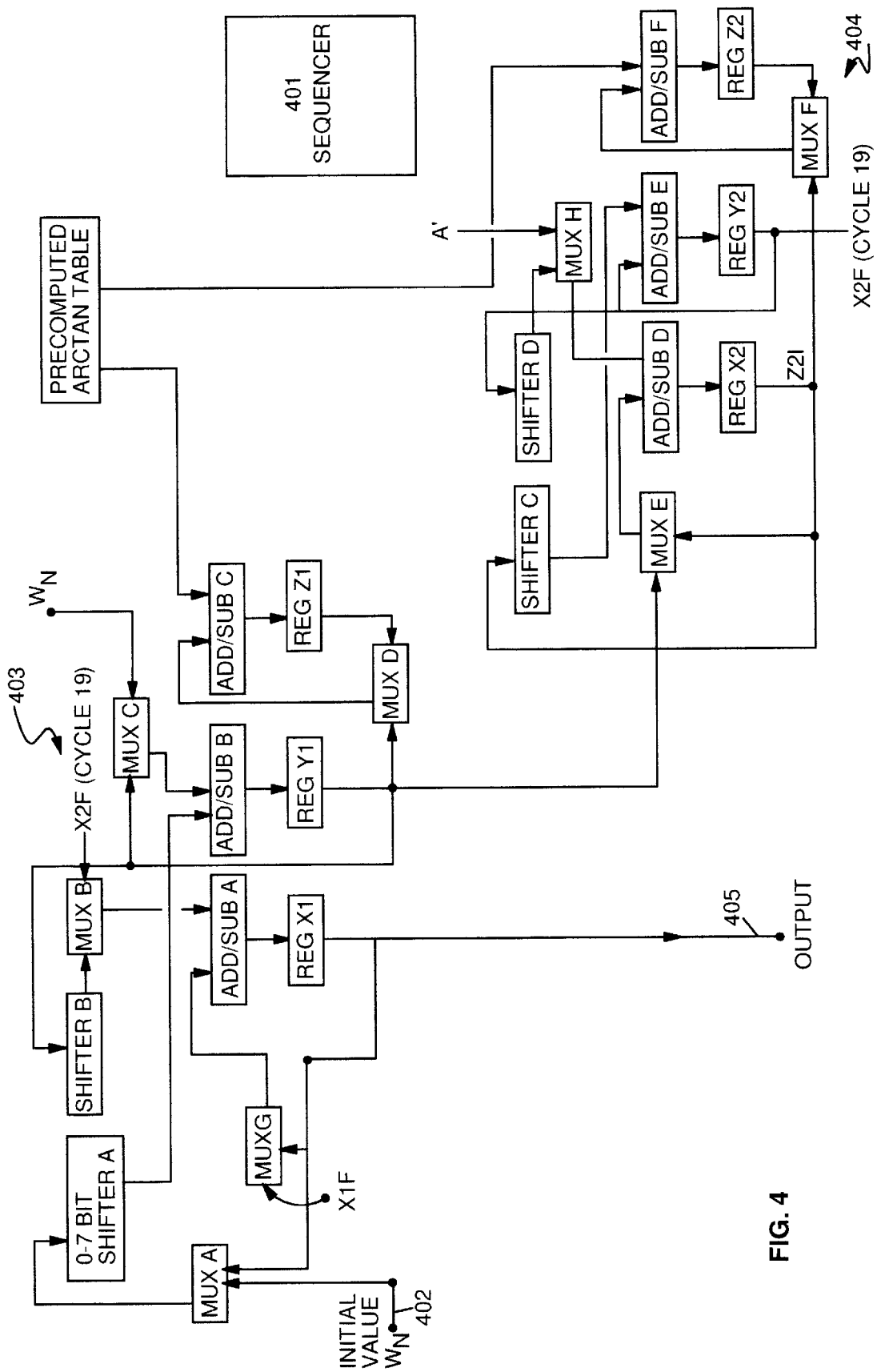
FIG. 4 is a block diagram of a dedicated digital circuit which can be used as an FM operator according to the present invention.

The reduction of multiplication and sine operations in the FM operator equation to sequences of additions and shifts allows the simplified hardware implementation which is one embodiment of this invention. We may now compute the FM operator equation by pipelining add and shift operations to suit our throughput requirements. The FM operator pipeline execution sequence is shown in FIG. 3, and a hardware implementation which performs the sequence is shown in FIG. 4. The operations listed in FIG. 3 correspond to the various shifters and add-subtract units shown in FIG. 4.

The various notations in FIG. 3 represent various inputs, outputs and terms as follows:

| Wn | Input phase |
| --- | --- |
| A' | Transformed scaling factor $=(2\cos^{-1}(A/2))$ |
| B | Shifted output of Sin 1 (feedback term p) |
| WB | Wn+B |
| X1 | Sine 1 CORDIC term |
| Y1 | Cos 1 CORDIC term |
| Z1 | Angle term |
| Z1I | Initial angle term |
| X1F | Final Sine 1 term |
| X2 | Sine 2 CORDIC term |
| Y2 | Cos 2 CORDIC term |
| Z2 | Angle term |
| Z2I | Initial angle term |
| X2F | Final Sine 2 term |
| AT0–AT15 | Arctan table terms (0–15) |
| OUT | Output of operator =(X1 F+X2F) |
| And: | |
| Sh | denotes a one or n bit shift operation |
| + | denotes an addition |

FIG. 4 shows a hardware circuit which performs the execution sequence of the present invention. The circuit consists of two computation units 403 and 404. These computations units perform the iterations of the CORDIC algorithm. An initial phase value input is supplied to the circuit through the input terminal 402 and the output is retrieved at output terminal 405. The entire circuit operates under the control of a sequencer 401. Connection from the sequencer 401 to the other components of the circuit are omitted for clarity. The computation sequence to compute the transformed FM operator in the preferred embodiment uses 19 cycles as shown in FIG. 3 on the circuit of FIG. 4 and can be described as follows.

In cycle (1), within computation unit 403, the output of the previous cycle stored in REG X1 input into shifter A and shifted by a specified (BETA) number of bits to provide the feedback term β. The feedback term β is added to the current input phase Wn by ADDER/SUBTRACTOR B (routed to ADDER/SUBTRACTOR B by MUX C). The output of ADDER/SUBTRACTOR B is stored in REG Y1 and is available as the WB or Z1I intermediate values on the next cycle.

In cycle (2), within computation unit 404, the WB intermediate value (routed via MUX E) is added to the precomputed transformed scaling factor A' (selected by MUX H) by ADDER/SUBTRACTOR D. This Z2I intermediate value is stored in REG X2 and is available on the next cycle.

Also in cycle (2), within computation unit 403, ADDER/SUBTRACTOR A is used to add/subtract, depending on the directive of the iteration sequence, the initial X1 (routed by MUX G) and Y1 (shifted by zero bits by SHIFTER B and routed by MUX B). The result is stored in REG X1. ADDER/SUBTRACTOR B is used to similarly add/subtract the initial X1 (routed by MUX A and shifted by zero bits by SHIFTER A) and Y1 (routed by MUX C) and the result is stored in REG Y1. ADDER/SUBTRACTOR C is used to add/subtract the initial Z1I (routed by MUX D) and the appropriate precomputed arctangent value from the PRE-COMPUTED ARCTAN TABLE, and the result is stored in REG Z1.

In cycle (3), within computation unit 404, ADDER/SUBTRACTOR D is used to add/subtract, depending on the directive of the iteration sequence, the initial X2 (routed by MUX E) and Y1 (shifted by zero bits by SHIFTER D and routed by MUX H). The result is stored in REG X2. ADDER/SUBTRACTOR E is used to similarly add/subtract the initial X2 (shifted by zero bits by SHIFTER C) and Y2 and the result is stored in REG Y2. ADDER/SUBTRACTOR C is used to add/subtract the initial Z2I (routed by MUX F) and the appropriate precomputed arctangent value from the PRECOMPUTED ARCTAN TABLE, and the result is stored in REG Z2.

In cycles (3) through (17), within computation unit 403, ADDER/SUBTRACTOR A is used to add/subtract, depending on the directive of the iteration sequence, X1 (routed by MUX G) and Y1 (shifted by SHIFTER B and routed by MUX B). The result is stored in REG X1. ADDER/SUBTRACTOR B is used to similarly add/subtract X1 (routed by MUX A and shifted by SHIFTER A) and Y1 (routed by MUX C) and the result is stored in REG Y1. ADDER/SUBTRACTOR C is used to add/subtract Z1 (routed by MUX D) and the appropriate precomputed arctangent value from the PRECOMPUTED ARCTAN TABLE, and the result is stored in REG Z1. At the end of cycle (17), the sine of the initial input angle Z1I will have been fully calculated and stored in REG Y1.

In cycles (4) through (18), within computation unit 404, ADDER/SUBTRACTOR D is used to add/subtract, depending on the directive of the iteration sequence, X2 (routed by MUX E) and Y1 (shifted s by SHIFTER D and routed by MUX H). The result is stored in REG X2. ADDER/SUBTRACTOR E is used to similarly add/subtract X2 (shifted by SHIFTER C) and Y2 and the result is stored in REG Y2. ADDER/SUBTRACTOR C is used to add/subtract Z2I (routed by MUX F) and the appropriate precomputed arctangent value from the PRECOMPUTED ARCTAN TABLE, and the result is stored in REG Z2. At the end of cycle (18), the sine of the initial input angle Z2I will have been fully calculated and stored in REG Y2. In cycle (19), the X1F and Y1F sine values are routed by MUX'es G and B and added by ADDER/SUBTRACTOR A to provide the final output value for the FM operator.

It should be noted that FIG. 4 shows a dedicated circuit implementation which performs the pipeline sequence shown in FIG. 3. It is also possible to perform the same sequence in a programmed processor such as a microprocessor. If the present method of FM synthesis is used for sound generation, the microprocessor would ideally be a digital signal processor. A digital signal processor normally contains special circuitry to enable sound transducer circuitry and to enhance sounds generated by FM synthesis.

Figure 5:
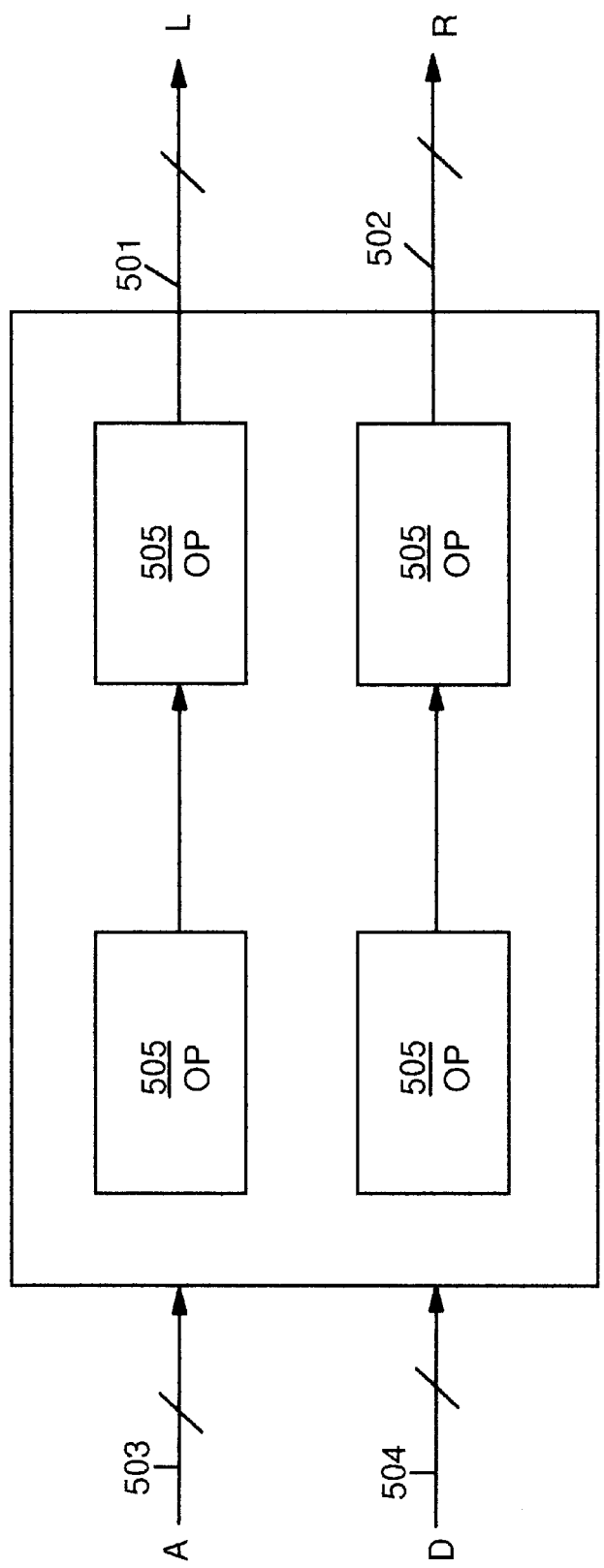
FIG. 5 shows a semiconductor chip in which the present invention is employed.

FIG. 5 shows a chip or semiconductor device on which the present invention is employed in sound synthesis. The chip as an address input 503 and a data input 504. FM operators 505 are integrated onto the chip. In the preferred embodiment, each operator is the operator shown in FIG. 4 and discussed above. Normally, multiple operators are used. They are placed in series to increase the complexity of the tones generated. There will also be multiple operators if multiple channels are desired, such as in this example, where a left channel output 501 and a right channel output 502 are incorporated together to make stereo sound. These operators can be constructed a number of different ways. They can each be physical descrete circuits like that shown in FIG. 4. Alternatively, an operator can be used multiple times to have the same effect as the layout of descrete circuits. This implementation requires greater processing power but reduces the area taken up by the operators on the device. The operators can also be implemented by one or more digital signal processor cores contained in the semiconductor device.

We have described a preferred embodiment of our invention for frequency modulation synthesis. Those skilled in the art, however, will quickly recognize that other embodiments are possible, and the detailed description herein is not meant to limit the scope of the appended claims. It should also be recognized that although we have shown an embodiment for use of the technique in music synthesis, the same technique can be employed in other systems where FM synthesis is used, such as radio communication systems.

We claim:

1. A method of frequency modulation synthesis comprising the steps of:

adding an input signal to a feedback signal to obtain a first resultant signal;

determining a first sine of the first resultant signal according to a coordinate rotation digital computer (CORDIC) algorithm;

adding the first resultant signal to a transformed amplitude to obtain a second resultant signal;

determining a second sine of the second resultant signal according to the coordinate rotation digital computer (CORDIC) algorithm;

adding the second sine to the first sine to obtain an output; and bit shifting the output to obtain a feedback factor for the feedback signal.

2. Frequency modulation synthesis apparatus comprising:

output and initial value input terminals;

a storage circuit for precomputed arctan values;

two or more computation units, the computation units connected to each other and to the storage circuit, and also connected to the output and initial value input terminals; and a sequencer controlling the computation units for iterating through a sine operation algorithm.

3. Frequency modulation synthesis apparatus comprising:

means for adding an input signal to a feedback signal to obtain a first resultant signal;

means for determining a first sine of the first resultant signal according to a coordinate rotation digital computer (CORDIC) algorithm;

means for adding the first resultant signal to a transformed amplitude to obtain a second resultant signal;

means for determining a second sine of the second resultant signal according to the coordinate rotation digital computer (CORDIC) algorithm;

means for adding the second sine to the first sine to obtain an output; and means for bit shifting the output to obtain a feedback factor for the feedback signal.

4. The frequency modulation synthesis apparatus of claim 3 implemented in a programmed processor.

5. A semiconductor device for frequency modulation synthesis, the semiconductor device comprising:

address and data inputs;

at least one output;

at least one operator disposed between the data input and said at least one output, said at least one operator further including a storage circuit for precomputed arctan values, two or more computation units, the computation units connected to each other and to the storage circuit, and also connected to the output, and a sequencer controlling the computation units for iterating through a sine operation algorithm.

6. A semiconductor device for frequency modulation synthesis, the semiconductor device comprising:

address and data inputs;

at least one output;

at least one operator disposed between the data input and said at least one output, said operator further including means for adding an input signal to a feedback signal to obtain a first resultant signal, means for determining a first sine of the first resultant signal according to a coordinate rotation digital computer (CORDIC) algorithm, means for adding the first resultant signal to a transformed amplitude to obtain a second resultant signal, means for determining a second sine of the second resultant signal according to the coordinate rotation digital computer (CORDIC) algorithm, means for adding the second sine to the first sine to obtain an output, and means for bit shifting the output to obtain a feedback factor for the feedback signal.

7. The semiconductor device of claim 6 wherein at least one operator is implemented in a programmed processor.

* * * * *